United States Patent Office 3,655,584
Patented Apr. 11, 1972

3,655,584
**CATALYST FOR THE RING OPENING POLYM-
ERISATION OF CYCLOPENTENE**
Wolfgang Oberkirch, Cologne, Peter Gunther, Opladen, and Gottfried Pampus, Leverkusen, Germany, assignors to Farbenfabriken Bayer Aktiengesellschaft, Leverkusen, Germany
No Drawing. Filed Apr. 20, 1970, Ser. No. 30,336
Int. Cl. C08f 5/00
U.S. Cl. 252—429 A
2 Claims

ABSTRACT OF THE DISCLOSURE

Catalyst for producing homo- and copolymers of cyclopentene comprising tungsten hexachloride which has been irradiated with light of a wave length of up to 7000 A. and an organo aluminum compound.

---

It is known that cyclopentene can be made to undergo a ring opening reaction and conversion into linear unsaturated polymers by means of catalysts of tungsten salts and aluminum alkyls. Unless co-catalysts, e.g. oxygen compounds as disclosed in British patent specification No. 1,062,367, are used in this process, however, only very poor yields are obtained even with large quantities of catalyst. This low catalytic activity cannot be significantly improved even by using very high monomer concentrations (mass polymerisation). It is particularly in the production of rubber that mass polymerisation has serious disadvantages.

This invention relates to a catalyst composition comprising tungsten hexachloride which has been irradiated with light of a wavelength of up to 7000 A. and an organic aluminum compound and which is suitable for preparing homo- and co-polymers of cyclopentene.

A particular advantage of this new catalyst is that it provides excellent yields of homo- and co-polymers of cyclopentene at low catalyst concentrations in the absence of any co-catalyst.

With this new catalyst, cyclopentene can be polymerised alone or together with di- or poly-cyclic olefines (preferably in quantities of 0.1 to 10% by weight based on cyclopentene). Particularly suitable comonomers are dicyclopentadiene, norbornene and norbornadiene.

The tungsten hexachloride may be irradiated, for example, as a solution with a 250 watt incandescent lamp for 0.5 to 30 hours from a distance of about 1 m. to 10 cm. The solvent which is used is preferably an aliphatic or aromatic hydrocarbon which may, if desired, be halogenated. The concentration of the solution may, for example, be 0.01 to 30%. The same solvent as that which is used for the polymerisation is generally used. The temperature during irradiation is preferably between about 40° and about 150° C., most preferred 45° to 65° C.

In a preferred embodiment, a solution of tungsten hexachloride in tetrachloroethylene is exposed to a 250 watt incandescent lamp from a distance of 40 to 80 cm. for 5 to 10 hours, and the product obtained after removal of the solvent is directly used as the tungsten component of the catalyst.

In one particularly simple embodiment, a tungsten hexachloride solution in an aromatic solvent is irradiated with a 250 watt incandescent lamp and polymerisation is effected subsequently in this same solution. Olefines such as propylene or 1-butene, diolefines such as butadiene or 1,3-pentadiene or also cyclic olefines such as the monomer, cycloheptene or cyclooctene may be present during the irradiation.

Suitable organic aluminum compounds are, for example, aluminum trialkyls preferably having 1–12 carbon atoms such as triethyl aluminum, triisobutyl aluminum, aluminum haloalkyls (alkyl having preferably 1–12 carbon atoms, halogen having preferably chlorine or bromine) such as diethyl aluminum chloride, ethyl aluminum sesquichloride or ethyl aluminum dichloride and alkoxy aluminum alkyls (alkoxy and alkyl containing preferably 1–12 carbon atoms) such as ethoxydiethyl aluminum.

The molar ratio of the catalyst components may vary within wide limits. A W:Al ratio of 1:0.5 to 1:5, preferably 1:0.8 to 1:1.5, has been found to be particularly advantageous.

0.1 to 5, preferably 0.2 to 2 mmol of tungsten compound may be used for 100 g. of the monomer.

The process may be carried out in bulk or, preferably, in solution. The following solvents may be used: aromatic solvents such as benzene or toluene, aliphatic and cycloaliphatic solvents such as hexane, heptane or cycloheptane and chlorinated hydrocarbons such as chloroform or chlorobenzene.

The monomer concentration in these solvents is preferably 10 to 30%.

The temperature employed during preparation of the catalyst may be between −60 and +30° C., preferably −30 to +10° C.

The catalyst is preferably prepared in the presence of the monomers.

Polymerisation starts immediately after the addition of the organic aluminum compound.

The polymerisation temperature may be between −80 and +40°, preferably between −40 and +20°, and the polymerisation time between 1 and 5 hours. High conversions (70 to 90%) of cyclopentene to form practically gel-free polypentenamers are thereby achieved.

When the required degree of conversion has been reached, polymerisation is stopped, e.g. by the addition of alcohols, carboxylic acids and/or amines. One of the usual products may be added as stabiliser and age resistor to the polymer solution, e.g. phenyl-$\beta$-naphthylamine, 2,6-di-tertiary butyl-4-methylphenol or 2,2'-dihydroxy-3,3'-di-tertiary butyl-5,5'-dimethyl-diphenylmethane in quantities of 0.2 to 3%.

The polymers may be isolated in known manner, e.g., by precipitation with an alcohol or by steam distillation.

The molecular weight of the polymers may be adjusted within wide limits by suitable variation of the catalyst and of the catalyst/monomer ratio, e.g. higher molecular weights are generally obtained with aluminum trialkyls than with alkyl aluminum halides.

The polymers obtained according to the invention are valuable rubber-like elastomers which can be processed in known manner.

The high trans double bond content which is required for good mechanical strength properties of the vulcanisates of the polypentenamers is easily achieved with the new catalyst. The polymers obtained by the process have a trans-content of 89 to 95%.

Copolymers of cyclopentene with 0.1 to 10% of dicyclopentadiene, norbornene, norbornadiene or indene as comonomers can equally well be obtained in high yields by the new process. These copolymers can be processed particularly well.

EXAMPLE 1

(A) Preparation of the tungsten compound 9.4 g. of tungsten hexachloride are dissolved in 50 ml. of tetrachloroethylene and irradiated with a 250 Watt incandescent lamp for 24 hours at 100° C. All the volatile constituents are then removed under vacuum. 6.9 g. of a black pulverulent residue remain behind.

(B) Polymerisation 90 mg. of the tungsten compound obtained according to (A) are dissolved in 200 ml. of toluene. 70 ml. of cyclopentene are added and the reaction mixture is cooled to −30° C. 0.5 ml. of a 1 molar solution of triisobutyl aluminum in heptane is then added. Within a short time, the contents of the flask solidfy. The mixture is kept at −30° C. for a total of 4 hours and the polymerisation is then stopped by adding a solution of isopropanol, tri-n-butyl-amine and 2,2′-dihydroxy - 3,3′ - di-t-butyl-5,5′-di-methyl-diphenylmethane in toluene. The polymer is precipitated in alcohol: 36 g. (72%).

Trans-double bonds: 90% [1] (by I.R. spectroscopy); [η]: 12.9 measured in toluene at 25° C.).

EXAMPLE 2

When the same procedure is used as is described in Example 1 but the whole reaction is carried out not at −30° C. but at −5° C., a yield of 35 g. (70%) is obtained.

Trans-double bonds: 91% [η]: 6.1 (measured in toluene at 25° C.).

EXAMPLE 3

10 ml. of a 0.05 molar solution of tungsten hexachloride in toluene are added to 200 ml. of toluene. This solution is irradiated with a bright lamp in (250 watt) for one hour with stirring and the temperature is kept constant at 50° C. by cooling with air. When the solution has been cooled to about 20° C., the HCl produced is driven off by means of a stream of nitrogen passed through the solution. 50 g. of cyclopentene are now added, the solution is cooled to −5° C., and 0.5 ml. of a 1 molar (i-Bu)₃Al solution in n-heptane is added. Again polymerisation immediately starts. The temperature is kept at −5° C. for 4 hours and polymerisation is then stopped by adding a mixture of i-propanol, tri-n-butylamine and 2,2′-dihydroxy-3,3′-di-tertiary butyl - 5,5′ - dimethyl-diphenylmethane as stabiliser, and the polymer is precipitated with alcohol. Yield: 37 g. (74%).

Trans-double bonds: 92.3%; [η]: 4.39 (measured in toluene at 25° C.).

Comparison example 10 ml. of a 0.05 molar solution of $WCl_6$ in toluene are added to 200 ml. of toluene, and 50 g. of cyclopentene are added to this mixture. After the mixture has been cooled to −5° C., it is reduced with 0.62 ml. of a 1 molar (i-Bu)₃Al solution in n-heptane. Polymerisation is allowed to proceed for 4 hours at −5° C. and the polymer is then worked up as described in Examples 1 to 3. Yield: 12 g. (24%).

We claim:

1. A catalyst suitable for preparing homo- and copolymers of cyclopentene, said catalyst consisting essentially of (a) tungsten hexachloride which has been irradiated with light of a wave length of up to 7,000 A. at a temperature of between about 40 and about 150° C. in an amount corresponding to that obtained with a 250 w. incandescent lamp positioned at a distance of about 1 m. to 10 cm. from the tungsten hexachloride for a time period of 0.5 to 30 hours and (b) aluminum trialkyl having from 1 to 12 carbon atoms, aluminum chloroalkyl having from 1 to 12 carbon atoms in the alkyl group, aluminum bromoalkyl having from 1 to 12 carbon atoms in the alkyl group or aluminum alkoxyalkyl having from 1 to 12 carbon atoms in the alkyl and alkoxy groups, the alkyl and alkoxy groups, the molar ratio of (a) to (b) being from 1:0.5 to 1:5.

2. The catalyst of claim 1 wherein said distance is from 40 to 80 cm. for a time period of from 5 to 10 hours.

References Cited

UNITED STATES PATENTS

| | | | |
|---|---|---|---|
| 3,449,310 | 6/1969 | Dall'Asta et al. | 252—429 B X |
| 3,498,961 | 3/1970 | Tazuma | 252—429 A X |
| 3,520,856 | 7/1970 | Dall'Asta | 252—429 A X |
| 3,546,133 | 12/1970 | Ziegler et al. | 252—429 A X |

FOREIGN PATENTS

| | | | |
|---|---|---|---|
| 610,519 | 12/1960 | Canada | 242—429 A |

PATRICK P. GARVIN, Primary Examiner

U.S. Cl. X.R.

260—93.1

[1] Calculation percent trans $= \dfrac{\frac{1}{10} \cdot E_{trans}}{\frac{1}{10} \cdot E_{trans} + \frac{1}{6} E_{cis}} \cdot 100$